(No Model.)
C. J. MINGLE.
CARRIAGE BODY.
No. 403,948. Patented May 28, 1889.
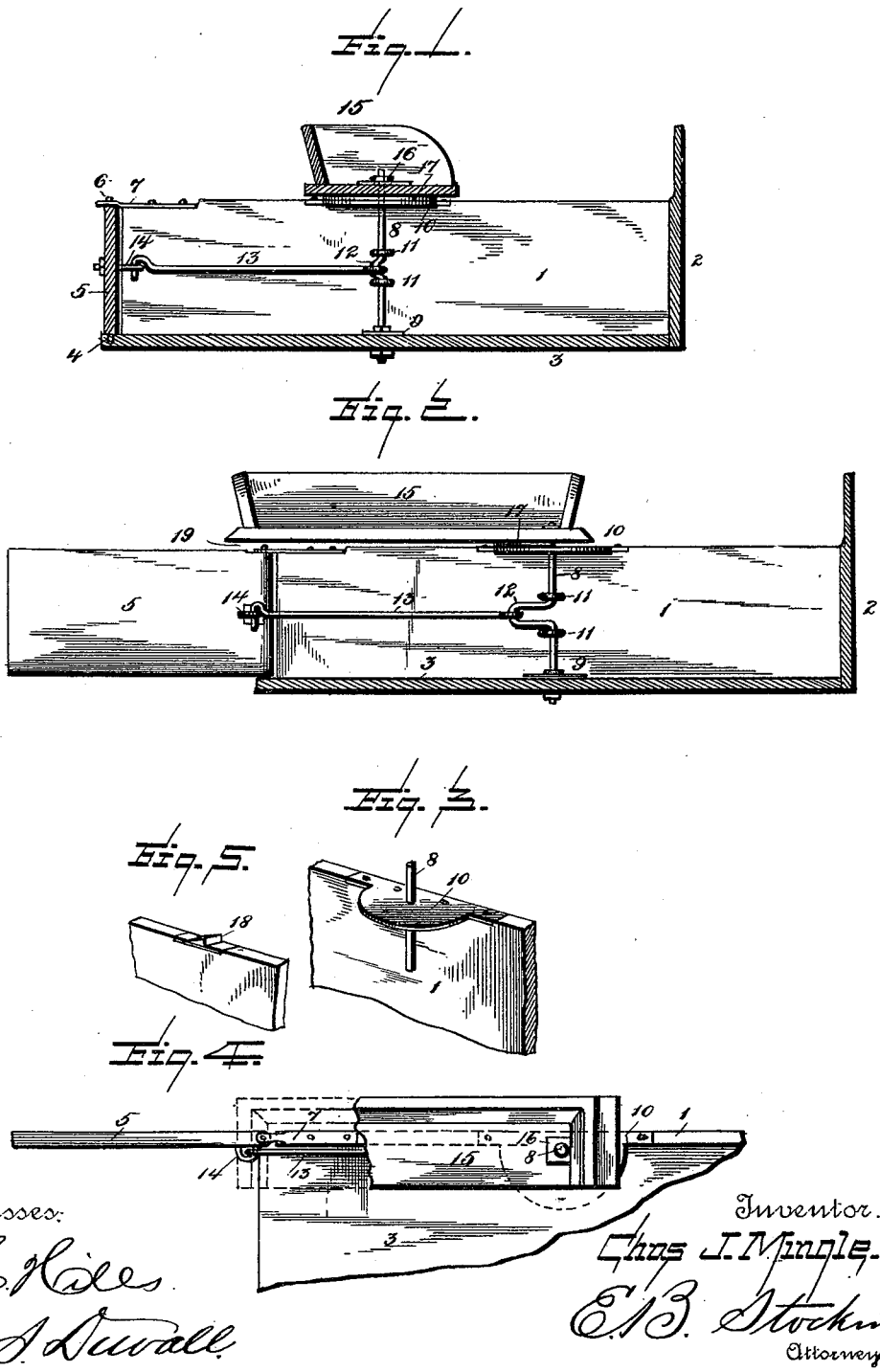
Witnesses:
S. C. Hills
W. S. Duvall
Inventor:
Chas. J. Mingle
E. B. Stocking
Attorney

UNITED STATES PATENT OFFICE.

CHARLES J. MINGLE, OF COLORADO SPRINGS, COLORADO.

CARRIAGE-BODY.

SPECIFICATION forming part of Letters Patent No. 403,948, dated May 28, 1889.

Application filed August 18, 1888. Serial No. 283,087. (No model.)

*To all whom it may concern:*

Be it known that I, CHARLES J. MINGLE, a citizen of the United States, residing at Colorado Springs, in the county of El Paso, State of Colorado, have invented certain new and useful Improvements in Carriage-Bodies, of which the following is a specification, reference being had therein to the accompanying drawings.

This invention has relation to seats for vehicles and mechanism for operating the same, and particularly to that class of vehicles provided with an end-gate, such as wagons, buggies, sulkies, &c.

Among the objects in view are to provide a seat and end-gate so connected that by opening either the corresponding operation will take place in the other, so that to enter a vehicle from the rear the end-gate is opened and a free passage-way to the front of the seat is provided, and by swinging the seat to the front or normal position the end-gate is closed.

Other objects and advantages of the invention will hereinafter appear, and the novel features thereof will be particularly pointed out in the claims.

Referring to the drawings, Figure 1 represents a substantially central longitudinal section of a vehicle-body provided with a seat and end-gate operatively connected in accordance with my invention, the parts being in their normal position. Fig. 2 is a similar view, the gate being open and the seat swung to the rear. Fig. 3 is a detail in perspective of the side wall of a vehicle, showing the manner of connecting the seat therewith. Fig. 4 is a plan in detail of a portion of the vehicle-body, the end-gate being open; and Fig. 5 is a detail hereinafter referred to.

Like numerals indicate like parts in all the figures of the drawings.

1 and 2 represent the side walls of a vehicle, 2×the dash, and 3 the bottom thereof. As is usual, the bottom 3 is projected slightly to the rear of the ends of the side walls and provided with a bearing, 4, for the lower edges of the swinging end-gate 5, the upper edge of said gate having a bearing, 6, in a projecting arm, 7, secured to the upper edge of the side wall, 1, and projecting beyond said edge.

8 represents a vertical rod pivoted in bearings 9, formed in the bottom of the vehicle and in a bearing-plate, 10, secured to the upper edge of the side 1 thereof, (see Fig. 3,) said rod being held in position by the vertically-opposite staples 11, and formed with a crank portion, 12, intermediate its ends. Leading from the crank portion 12 of the rod 8 is an arm, 13, which is loosely connected with said crank portion and provided with a hook end, which is inserted in an eye of staple 14, driven in or secured to the inner hinged side of the end-gate 5.

Upon the upper end of the rod 8 and rigid therewith is the seat 15, said rod preferably passing through the seat, as shown in Fig. 1, and being held in place by being squared therein or by a nut, 16, so that the seat and rod move in unison. Secured to the bottom of the seat, and intermediate thereof and the plate 10, is a curved wearing-plate, 17, which when the seat is oscillated or swung back and forth, as hereinafter described, rides upon the plate 10. By this construction it is apparent that a person standing upon the ground and opening the end-gate the same will draw upon the rod 13 and partially rotate the crank-rod 8, which carries with it the seat 15, so that a clear passage is afforded for either loading the vehicle or the entrance of passengers. It is also apparent that persons being in the vehicle may, by swinging the seat 15 to the rear in a like manner, open the end-gate.

As shown in Fig. 5, I may provide the side 2 of the vehicle with a catch, 18, over which a similar catch, 19, secured to that side of the seat 15 opposite its pivot, can take, thus retaining the seat in position when closed. This catch may be of any suitable form, and is preferably of such a form as will not interfere with the ready swinging of the seat when operated by the end-gate.

Having described my invention, what I claim is—

1. The combination, with the sides and bottom of a vehicle, of the end-gate 5, the rod 8, mounted in bearings 9 and 10 and having the crank portion 12, seat 15, the rod 13, and the eye 14, substantially as specified.

2. The combination, with a vehicle having the bearings 9 and 10, of the rod 8, staples 11, for holding the same, intermediate crank portion, 12, the rod 13, the eye 14, the end-gate 5, seat 15, and plate 17, substantially as specified.

In testimony whereof I affix my signature in presence of two witnesses.

CHARLES J. MINGLE.

Witnesses:
FRANK G. PECK,
C. R. BERREY.